(12) United States Patent
Juroszek et al.

(10) Patent No.: US 10,358,014 B2
(45) Date of Patent: Jul. 23, 2019

(54) PRESSURE RELIEF ASSEMBLY (71) Applicant: ILLINOIS TOOL WORKS INC., Glenview, IL (US)

(72) Inventors: Piotr J. Juroszek, woj. Slaskie (PL); Zbigniew J. Sikora, woj. Slaskie (PL)

(73) Assignee: Illinois Tool Works Inc., Glenview, IL (US)

( * ) Notice: Subject to any disclaimer, the term of this patent is extended or adjusted under 35 U.S.C. 154(b) by 457 days.

(21) Appl. No.: 14/435,751

(22) PCT Filed: Oct. 8, 2013

(86) PCT No.: PCT/US2013/063875
§ 371 (c)(1),
(2) Date: Apr. 15, 2015

(87) PCT Pub. No.: WO2014/070389
PCT Pub. Date: May 8, 2014

(65) Prior Publication Data
US 2015/0283882 A1 Oct. 8, 2015

Related U.S. Application Data

(60) Provisional application No. 61/719,664, filed on Oct. 29, 2012.

(51) Int. Cl.
*B60H 1/24* (2006.01)
*F24F 13/14* (2006.01)
*F16K 15/03* (2006.01)

(52) U.S. Cl.
CPC ............. *B60H 1/249* (2013.01); *F16K 15/03* (2013.01); *F24F 13/14* (2013.01); *Y10T 137/7903* (2015.04)

(58) Field of Classification Search
CPC ......... B60H 1/248; B60H 1/249; F24F 13/14; F16F 15/035; F16F 15/03; Y10T 137/7903
(Continued)

(56) References Cited

U.S. PATENT DOCUMENTS 426,628 A * 4/1890 Smith .................... F24F 11/047
110/165 R
2,640,410 A * 6/1953 Raider ............... B61D 27/0018
137/527.8
(Continued)

FOREIGN PATENT DOCUMENTS

DE 4409752 9/1995
DE 202006020365 U1 5/2008
(Continued)

OTHER PUBLICATIONS

ISR and WO for PCT/US2013/063875 dated Mar. 4, 2014.

*Primary Examiner* — Gregory L Huson
*Assistant Examiner* — Dana Tighe
(74) *Attorney, Agent, or Firm* — Quarles & Brady LLP (57) ABSTRACT

A pressure relief assembly may include at least one pressure relief chamber including a membrane support base connected to a counterbalance clearance space. The membrane support base defines one or more air passages. The pressure relief assembly may also include at least one flap sub-assembly pivotally secured to the at least one pressure relief chamber. Each flap sub-assembly may include a pivot bracket pivotally secured to the at least one pressure relief chamber and including a counterbalance configured to pivot into the counterbalance clearance area, and a membrane flap securely connected to the pivot bracket. The membrane flap seats on the membrane support base over the one or more air passages in a closed position, and is configured to move into an open position. The counterbalance counterbalances the
(Continued)

membrane flap and pivots into the counterbalance clearance area when the membrane flap moves into the open position.

22 Claims, 6 Drawing Sheets

(58) Field of Classification Search
USPC .......... 454/70, 146, 149, 151, 162, 164, 165
See application file for complete search history.

(56) References Cited

U.S. PATENT DOCUMENTS

| | | | | |
|---|---|---|---|---|
| 3,674,203 | A * | 7/1972 | McGrath | F24F 5/0003 236/38 |
| 4,605,041 | A * | 8/1986 | Teumer | F16K 27/0227 137/515.7 |
| 5,105,849 | A * | 4/1992 | Clough | B60H 1/249 137/512.15 |
| 5,727,999 | A * | 3/1998 | Lewis | B60H 1/249 137/527.8 |
| 5,759,097 | A * | 6/1998 | Bernoville | B60H 1/249 137/512.1 |
| 6,210,266 | B1 * | 4/2001 | Barton | B29C 45/1676 137/855 |
| 6,691,736 | B2 * | 2/2004 | Liu | F16K 15/03 137/527.8 |
| 2009/0098819 | A1 * | 4/2009 | Lambrecht | F24F 13/18 454/333 |
| 2010/0243083 | A1 | 9/2010 | Shereyk | |
| 2011/0041930 | A1 | 2/2011 | Kiezulas | |

FOREIGN PATENT DOCUMENTS

| | | |
|---|---|---|
| DE | 112008002753 | 8/2010 |
| EP | 0673795 A1 | 9/1995 |
| GB | 191115926 A | 2/1912 |

* cited by examiner

PRESSURE RELIEF ASSEMBLY

RELATED APPLICATIONS

The present application is national phase of International Application Number PCT/US2013/063875 filed Oct. 8, 2013 and relates to and claims priority benefits from U.S. Provisional Patent Application No. 61/719,664 filed Oct. 29, 2012, which is hereby incorporated by reference in its entirety.

FIELD OF EMBODIMENTS OF THE DISCLOSURE

Embodiments of the present disclosure generally relate to venting or pressure relief assemblies configured for use in an enclosed area, such as an automobile, and more particularly to pressure relief assemblies having one or more counterbalanced membrane flaps.

BACKGROUND

Vehicles typically include cabin vents or pressure relief devices. Without such devices, air pressure inside a vehicle cabin could damage ear drums of occupants of the vehicle. Further, when a vehicle door is closed, air pressure within the vehicle needs to be relieved or the door typically is unable to fully close. If an air bag is deployed in a vehicle that does not have a venting or pressure relief device, ear drums of an occupant of the vehicle could be damaged.

Pressure relief devices are usually hidden from view. For example, a pressure relief device may be found in a trunk or on a body frame pillar structure. Each pressure relief device is adapted to allow air to pass out of an enclosed structure, while also preventing a significant amount of air, dust, water or other contaminants from passing into the enclosed area. Thus, pressure relief devices are, in essence, one-way valves that are configured to maintain a small amount of back pressure.

A pressure relief device may include a plastic main body having a plurality of air passages. A light membrane flap, such as formed of sanoprene, foam material, or the like, is positioned over each air passage, and is configured to allow air to pass in one direction. In order to allow air to pass, the light membrane flap opens off of the main body in response to air flow. Typically, a seal is provided around the main body and acts to seal the hole in the mating structure upon assembly. The seal is typically molded around the main body in a secondary molding operation, or may be adhesively or chemically attached to the main body.

During installation, the pressure relief device may be snap fit to a structure. Typically, an installer presses on the four corners of the pressure relief device in order to secure the pressure relief device within a reciprocal hole in a structure, such as a vehicle frame.

Typical pressure relief devices may produce noise during operation. For example, when a membrane flap is urged open, the membrane flap may produce an undesired flapping sound.

Summary of Embodiments of the Disclosure

Certain embodiments of the present disclosure provide a pressure relief assembly that may include at least one pressure relief chamber and at least one flap-sub-assembly. The pressure relief chamber may include a membrane support base connected to a counterbalance clearance space. The membrane support base may define one or more air passages. The flap sub-assembly may be pivotally secured to the pressure relief chamber. The flap sub-assembly may include a pivot bracket pivotally secured to the pressure relief chamber and that includes a counterbalance configured to pivot into the counterbalance clearance area. The flap sub-assembly may also include a membrane flap securely connected to the pivot bracket. The membrane flap seats on the membrane support base over the air passage(s) in a closed position, and is configured to move into an open position (such as through the force of air pressure). The counterbalance counterbalances the membrane flap and is configured to pivot into the counterbalance clearance area when the membrane flap moves into the open position.

The pivot bracket may also include an intermediate beam between the counterbalance and a membrane retaining portion that securely retains a portion of the membrane flap. The counterbalance may have a greater mass than one or both of the intermediate beam and the membrane retaining portion. The counterbalance may have a greater depth than one or both of the intermediate beam and the membrane retaining portion. Further, the counterbalance may be longer than one or both of the intermediate beam and the membrane retaining portion.

The membrane flap may include one or both of a tapered distal edge or tapered lateral edges. The membrane support base may include a perimeter frame defining a central air passage. The perimeter frame may include a membrane-engaging protuberance configured to sealingly engage the membrane flap in the closed position.

Each pressure relief chamber may include at least one guide ramp configured to guide the at least one flap assembly into a pivotally-secured position with respect to the at least one pressure relief chamber. The guide ramps are used during an assembly process to ensure that each flap assembly is properly connected with respect to a respective pressure relief chamber.

Certain embodiments of the present disclosure provide a flap assembly configured to be pivotally secured to a pressure relief chamber. The flap assembly may include a pivot bracket configured to be pivotally secured to the pressure relief chamber and including a counterbalance configured to pivot into a counterbalance clearance area of the pressure relief chamber. The flap assembly may also include a membrane flap securely connected to the pivot bracket. The counterbalance counterbalances the membrane flap.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide venting or pressure relief assemblies that include one or more counterbalanced membrane flaps. The counterbalanced membrane flaps provide smooth and consistent operation that minimizes, eliminates, or otherwise reduces undesired flapping noise. The venting or pressure relief assemblies may be used with respect to an enclosed structure, such as within an automobile. However, the assemblies may be used with various other structures, components, and the like that vent air or other gases.

Figure 1:
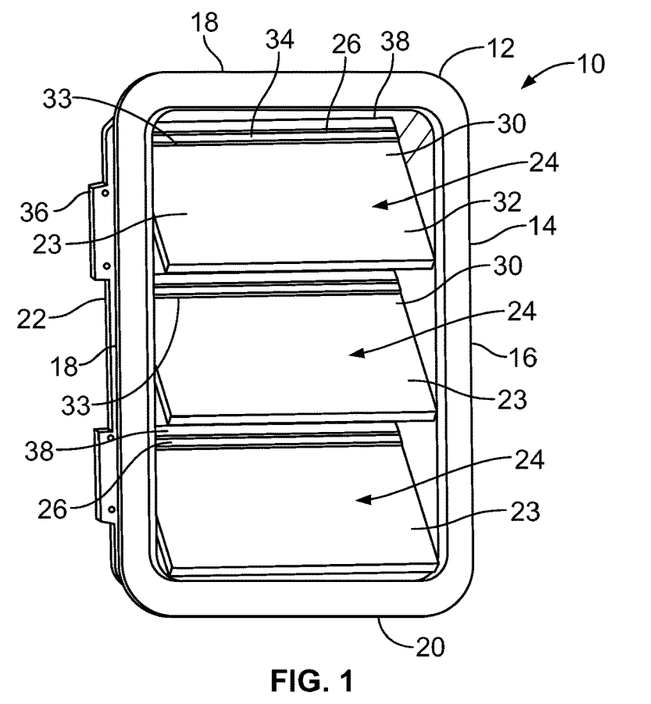
FIG. 1 illustrates a perspective front view of a vent assembly or pressure relief assembly, according to an embodiment of the present disclosure.

FIG. 1 illustrates a perspective front view of a vent assembly or pressure relief assembly 10, according to an embodiment of the present disclosure. The pressure relief assembly 10 includes a main body 12, which may be formed of plastic, for example. The main body 12 includes an outer rim 14 having opposed sides 16 integrally formed with a top 18 and bottom 20. The sides 16 may be generally perpendicular to the top 18 and bottom 20. However, the main body 12 may be formed in various shapes and sizes. The main body 12 also includes a base 22 defining a plurality of air passages (hidden from view in FIG. 1). The main body 12 includes a plurality of pressure relief chambers 23, which may be defined by the base 22 and the outer rim 14. The pressure relief assembly 10 may include more or less pressure relief chambers 23 than shown in FIG. 1.

A flap assembly 24 is pivotally secured over each air passage. While the pressure relief assembly 10 is shown having three pressure relief flap assemblies 24 positioned over three air passages, the pressure relief assembly 10 may alternatively include more or less pressure relief flap assemblies 24 pivotally secured over air passages than shown in FIG. 1.

Each flap assembly 24 includes a pivot bracket 26 that retains a proximal edge 30 of a membrane flap 32. The pivot bracket 26 includes a membrane retaining portion 33 that securely retains the proximal edge 30 of the membrane flap 32. The pivot bracket 26 also includes opposed pivot members (hidden from view in FIG. 1) that outwardly extend from an intermediate beam 34 and/or the membrane retaining portion 33. The pivot members, which may be posts, hinges, studs, cylinders, or the like, are pivotally secured within reciprocal openings or recesses (hidden from view in FIG. 1) formed within or through lateral walls 36 of the base 22. The pivot bracket 26 also includes a counterbalance 38 integrally connected to the intermediate beam 34 at an opposite end from the membrane retaining portion 33.

Each membrane flap 32 may be formed of sanoprene, foam material, or the like, and is configured to allow air to pass in one direction. In order to allow air to pass, the membrane flaps 32 open off of the air passages in response to air flow. A seal may be provided around the main body 12. For example, the seal may be molded around the main body 12 in a secondary molding operation, or may be adhesively or chemically attached to the main body.

During installation, the pressure relief assembly 10 may be snap fit to a structure. Typically, an installer presses on the sides 16, the top wall 18, and the bottom wall 20 of the pressure relief assembly 10 in order to secure the pressure relief assembly 10 within a reciprocal hole in a structure, such as a vehicle frame.

The pressure relief assembly 10, including the main body 12 and the membrane flaps 32, may be further described in U.S. Pat. No. 8,360,104, entitled "Pressure Relief Assembly," which is hereby incorporated by reference in its entirety.

Figure 2:
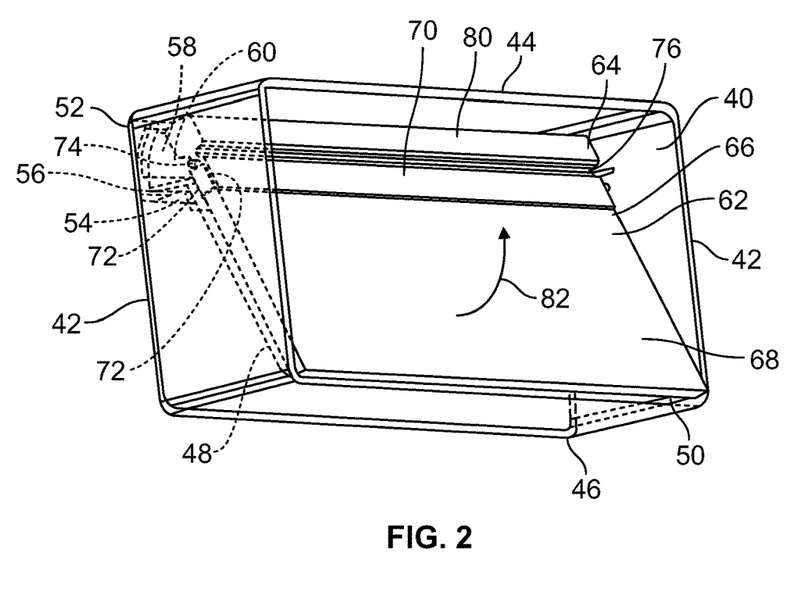
FIG. 2 illustrates a perspective front view of a pressure relief chamber, according to an embodiment of the present disclosure.

FIG. 2 illustrates a perspective front view of a pressure relief chamber 40, according to an embodiment of the present disclosure. The pressure relief chamber 40 may be an example of any of the pressure relief chambers 23 shown in FIG. 1. Each pressure relief chamber 40 may be integrally formed with the main body 12, shown in FIG. 1. Alternatively, each pressure relief chamber 40 may be a cartridge that is removably secured to the main body 12. For example, the pressure relief chamber 40 may be snapably secured into a reciprocal opening formed through the main body 12.

The pressure relief chamber 40 may be defined by opposed lateral walls 42 integrally formed with a top wall 44 and a bottom wall 46. A membrane support base 48 extends from a front edge 50 of the bottom wall 46 towards a rear edge 52 of the top wall 44. The membrane support base 48 may angle from the front edge 50 of the bottom wall 46 toward the rear edge 52 of the top wall 44. As shown in FIG. 2, the membrane support base 48 may not, however, linearly connect to the rear edge 52 of the top wall 44. Instead, an end 54 of the membrane support base 48 may integrally connect to a recessed wall 56 that may generally be parallel with the top and bottom walls 44 and 46, respectively. The recessed wall 56, in turn, connects to an arcuate wall 58 that connects to the top wall 44. As such, the recessed wall 56 and the arcuate wall 58 form a counterbalance clearance space 60. Alternatively, the arcuate wall 58 may be a linear wall.

One or more air passages (hidden from view) are formed through the membrane support base 48. For example, a single air passage may be formed through a central planar portion of the membrane support base 48. Alternatively, a plurality of air passages may be formed through the membrane support base 48.

A flap assembly 62 is pivotally secured within the pressure relief chamber 40. The flap assembly 62 may be an example of any of the pressure relief flap assemblies 24 shown with respect to FIG. 1. The flap assembly 62 includes a pivot bracket 64 that retains a proximal edge 66 of a membrane flap 68, which extends over a front planar surface, such as a perimeter frame, of the membrane support base 48. The pivot bracket 64 includes a membrane retaining portion 70 that securely retains the proximal edge 66 of the membrane flap 68. For example, as shown, the proximal edge 66 may be compressively sandwiched between opposed clip arms 72. As noted above, the pivot bracket 64 also includes opposed pivot members 74 that outwardly extend from opposite sends of an intermediate beam 76 and/or a proximal end of the membrane retaining portion 70 that joins the opposed clip arms 72. The pivot members 74, which may be posts, hinges, studs, cylinders, or the like, are pivotally secured within reciprocal openings formed in or through the lateral walls 42. The pivot bracket 64 also includes a counterbalance 80 integrally connected to the intermediate beam 76 at an opposite end from the membrane retaining portion 70.

While the membrane flap 68 seats over the membrane support base 48 in a closed position (in which the membrane flap 68 closes the one or more air passages), the counterbalance 80 is suspended over the counterbalance clearance space 60. As such, the counterbalance 80 may downwardly pivot, through operation of the opposed pivot members 74, into the counterbalance clearance space 60 when air pressure of sufficient magnitude forces the membrane flap 68 off the membrane support base 48 into an open position (in which the one or more air passages are opened). Thus, as the membrane flap 68 pivots off the membrane support base 48 in the direction of arc 82, the counterbalance 80 pivots downwardly into the counterbalance clearance space 60 in an opposite direction.

Each membrane flap 32 may be formed of sanoprene, foam material, or the like, and is configured to allow air to pass in one direction. In order to allow air to pass, the membrane flaps 32 open off of the air passages in response to air flow. A seal may be provided around the main body 12. For example, the seal may be molded around the main body 12 in a secondary molding operation, or may be adhesively or chemically attached to the main body.

Figure 3:
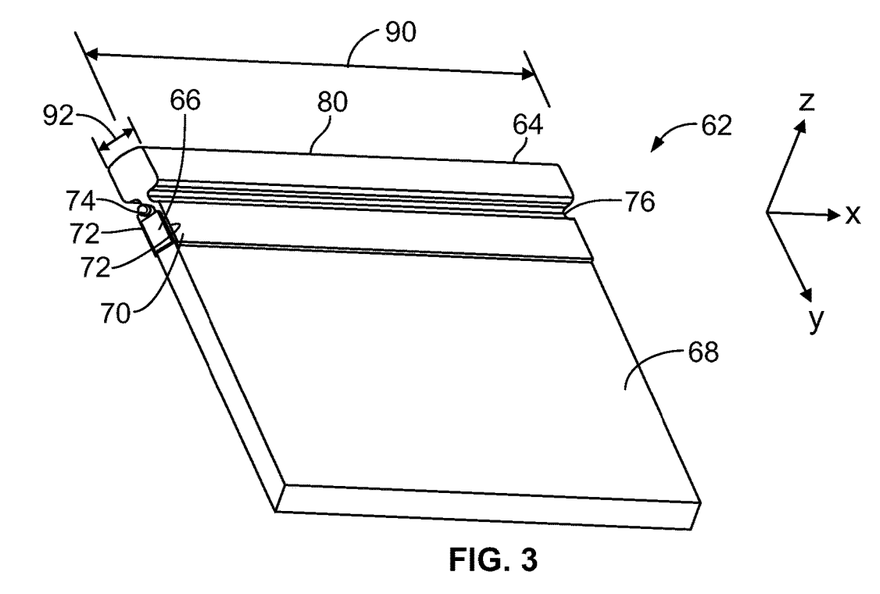
FIG. 3 illustrates a perspective front view of a flap assembly, according to an embodiment of the present disclosure.

FIG. 3 illustrates a perspective front view of the flap assembly 62, according to an embodiment of the present disclosure. As shown, the counterbalance 80 may include a majority of the mass of the pivot bracket 64. The counterbalance 80 may have a width 90 (in relation to the X axis) that is as long as the width of the membrane flap 68. Alternatively, the counterbalance 80 may not be as wide as the membrane flap 68.

The counterbalance 80 may have a height or depth 92 (in relation to the Z axis) that is greater than that of the intermediate beam 76 and the membrane retaining portion 70. For example, the counterbalance 80 may have a depth that is two to four times that of the intermediate beam 76, and two to three times that of the membrane retaining portion 70. Alternatively, the counterbalance 80 may have a depth that is greater or less than that described above.

Additionally, as shown in FIG. 3, the counterbalance 80 may have a length (in relation to the Y axis) that is longer than that of one or both of the intermediate beam 76 and the membrane retaining portion 70. For example, the counterbalance 80 may be four or five times as long as the intermediate beam 76, and twice as long as the membrane retaining portion 70. Alternatively, the counterbalance 80, the intermediate beam 76, and the membrane retaining portion 70 may have lengths that are greater or less than those described and shown.

The counterbalance 80 may be a solid block of material, such as plastic or metal. Optionally, the counterbalance 80 may include hollow portions. The size, shape, and weight of the counterbalance may be varied or otherwise tuned to a desired performance level. For example, the counterbalance 80 may be sized and shaped to recede into the counterbalance clearance space 60 when air pressure at a particular magnitude is exerted into an underside of the membrane flap 68.

The pivot bracket 64 may be integrally formed and molded as a single piece of material, such as plastic or metal. Optionally, one or more of the counterbalance 80, the intermediate beam 76, and the membrane retaining portion 70 may be formed as separate pieces and joined together, such as through fasteners, adhesives, bonding, and/or the like. For example, the counterbalance 80 may be a solid piece of metal, while the intermediate beam 78 and the membrane retaining portion 70 are formed from a plastic having a mass and density that are less than those of the metal.

Figure 4:
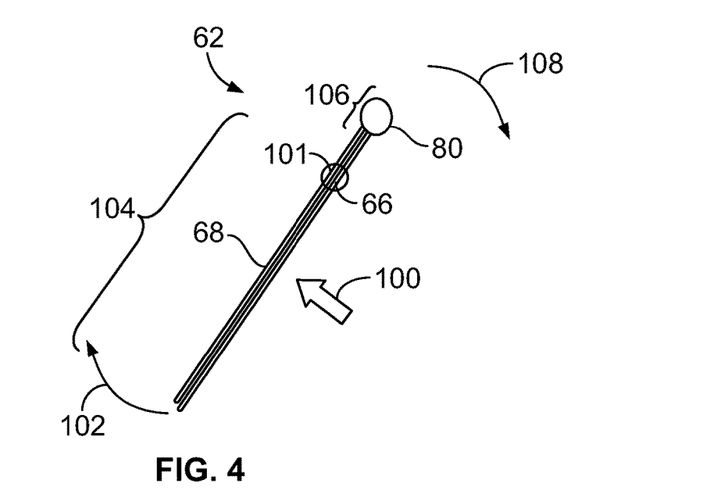
FIG. 4 illustrates a simplified lateral view of a flap assembly, according to an embodiment of the present disclosure.
Figure 5:
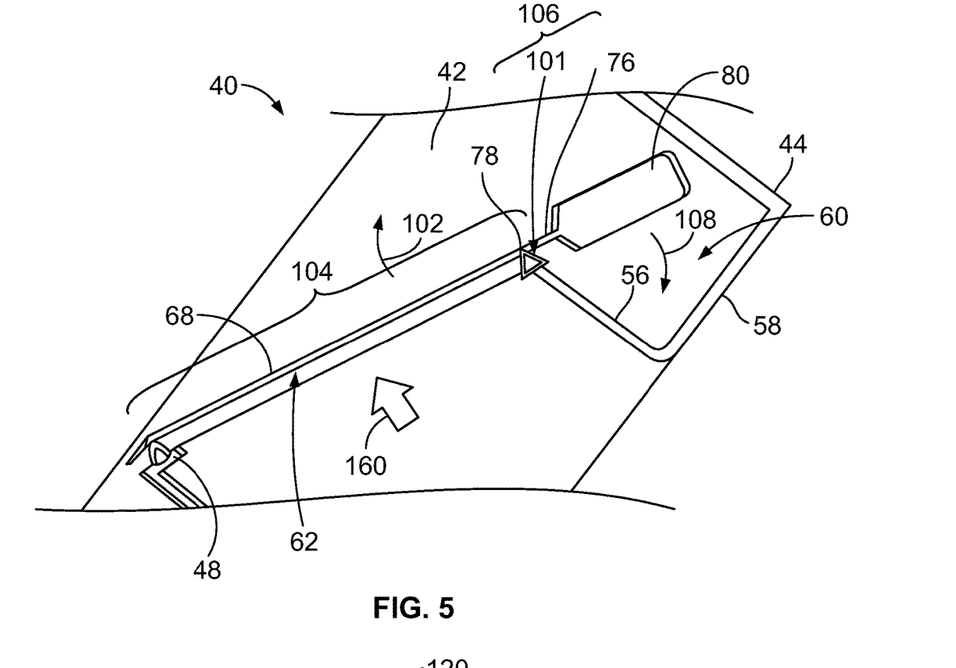
FIG. 5 illustrates a lateral internal view of a pressure relief chamber, according to an embodiment of the present disclosure.

FIG. 4 illustrates a simplified lateral view of a flap assembly 62, according to an embodiment of the present disclosure. FIG. 5 illustrates a lateral internal view of the pressure relief chamber 40. Referring to FIGS. 2-5, as air 100 forces the membrane flap 68 open in the direction of arc 102, the flap assembly 62 pivots about a hinge or pivot area 101 defined by the pivot members 74 rotatably secured within reciprocal openings or recessed formed in the lateral walls 42 (shown in FIG. 2). The pivot area 101 is positioned between the membrane flap 68 and the counterbalance 80. The length 104 of the membrane flap 68 exceeds the length 106 of the counterbalance 80. For example, the length 104 may be four times the length 106. Alternatively, the lengths 104 and 106 may be greater or less than shown and described. The counterbalance 80 is configured to counterbalance the weight of the membrane flap 68. As the flap assembly 62 pivots about the pivot area 101 in the direction of arc 102, the counterbalance 80 pivots about the pivot area 101 in the opposite direction of arc 108. It has been found that the counterbalancing relationship between the counterbalance 80 and the membrane flap 68 provides smooth, consistent operation, while also minimizing, eliminating, or otherwise reducing any flapping noise that may be generated by the membrane flap 68 during operation.

Figure 6:
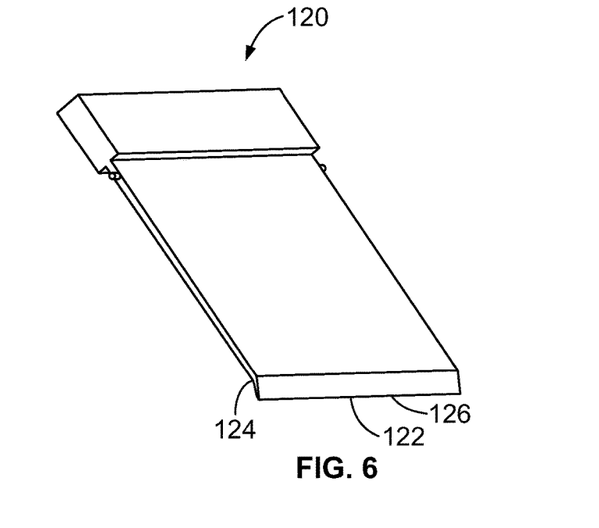
FIG. 6 illustrates a perspective front view of a flap assembly, according to an embodiment of the present disclosure.
Figure 7:
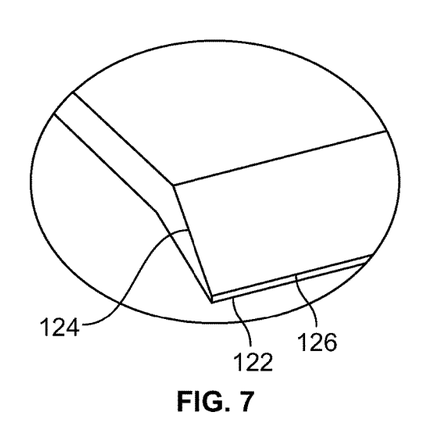
FIG. 7 illustrates a perspective front view of a distal edge portion of a flap assembly, according to an embodiment of the present disclosure.

FIG. 6 illustrates a perspective front view of a flap assembly 120, according to an embodiment of the present disclosure. FIG. 7 illustrates a perspective front view of a distal edge portion 122 of the flap assembly 120, according to an embodiment of the present disclosure. Referring to FIGS. 6 and 7, the distal edge portion 122 includes a tapered or beveled portion 124 that may taper or bevel down to an apex 126. It has been found that the thinned, tapered distal edge portion 122 further reduces flapping noise. Any of the pressure relief members disclosed in the present application may include a distal edge portion 122 as shown in FIGS. 5 and 6.

Referring to FIGS. 1-7, embodiments of the present disclosure provide pressure relief assemblies including counterbalances that are configured to provide smooth, efficient operation without the use of a stiffening rib or the like. For example, membrane flaps may extend from pivot brackets without any support rib extending therein or therethrough. The counterbalances ensure consistent flap movement, while reducing flapping noise. Further, the membrane flap may include a thinned distal edge that may also reduce flapping noise.

Figure 8:
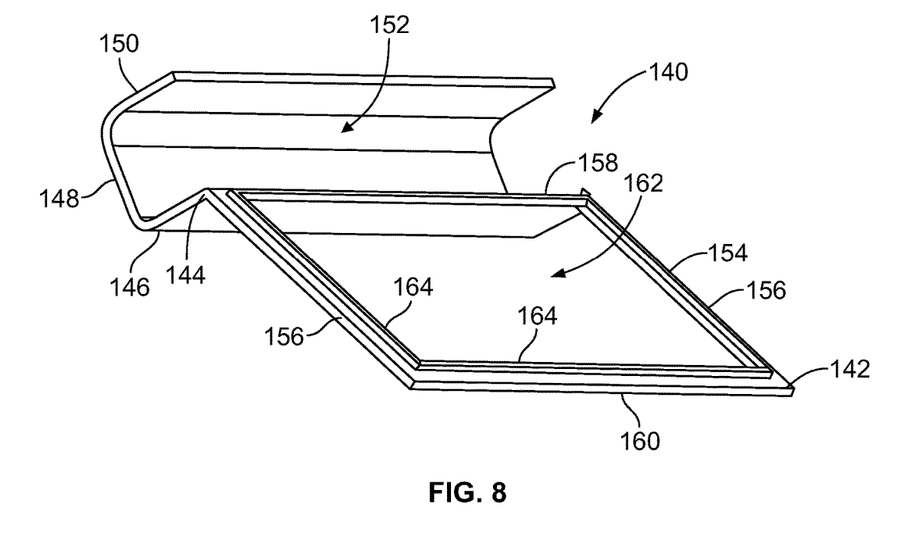
FIG. 8 illustrates a perspective front view of a pressure relief chamber, according to an embodiment of the present disclosure.

FIG. 8 illustrates a perspective front view of a pressure relief chamber 140, according to an embodiment of the present disclosure. For the sake of clarity, the lateral walls are not shown in FIG. 8. As described above, the pressure relief chamber 140 includes a membrane support base 142 having a proximal edge 144 connected a recessed wall 146, which, in turn, connects to a perpendicular (or arcuate) wall 148, which connects to a top wall 150. A counterbalance clearance space 152 is defined between the walls 146, 148, and 150.

The membrane support base 142 may be angled with respect to the walls 148 and 150, for example, as described above. Alternatively, the membrane support base 142 may be parallel or perpendicular to either the wall 148 or 150.

The membrane support base 142 may be formed as a perimeter frame 154 having lateral frame supports 156 integrally connected to perpendicular upper and lower frame supports 158 and 160, respectively. A central air passage 162 may be defined between the frame supports 156, 158, and 160. Optionally, instead of a single air passage 162, multiple air passages may be formed and separated from one another with respect to the membrane support base 142.

A membrane-engaging protuberance 164 may extend upwardly from the frame 154. The membrane-engaging protuberance 164 may be an upstanding rim, ridge, rib, perimeter tab, and/or the like. The membrane-engaging protuberance 164 is configured to engage a lower perimeter of a membrane flap. As such, the membrane-engaging protuberance 164 contacts four outer edge portions, namely, lateral, top and bottom edge portions, of the membrane flap when the membrane flap seats on the membrane support base 142. As such, the membrane-engaging protuberance 164 provides a sealing engagement with the membrane flap that may be used in place of a separate and distinct overmolded seal.

The pressure relief chamber 140 may be used with any of the embodiments described above.

Figure 9:
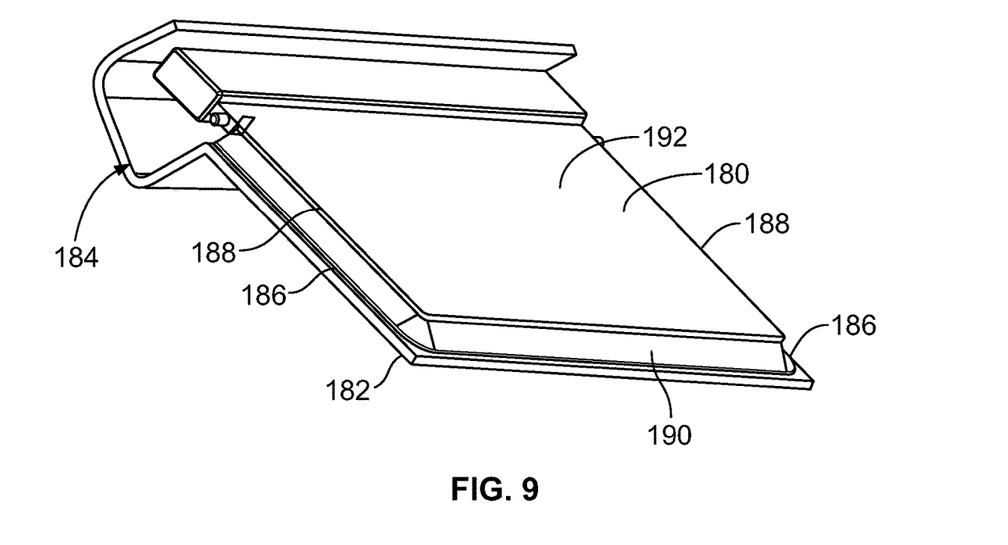
FIG. 9 illustrates a perspective front view of a flap assembly seated on a membrane support base of a pressure relief chamber, according to an embodiment of the present disclosure.

FIG. 9 illustrates a perspective front view of a flap assembly 180 seated on a membrane support base 182 of a pressure relief chamber 184, according to an embodiment of the present disclosure. The flap assembly 180 is similar to the flap assembly 120, for example, except that the flap assembly 180 also includes tapered edge portions 186 at lateral edges 188 as well as the distal edge 190. As such, a tapered, beveled edge or lip extends around the exposed free edges of the membrane flap 192. The tapered, beveled edge or lip also acts to reduce noise that would otherwise be generated by the flapping of the membrane flap 192.

The relief flap member 180 may be used with any of the embodiments described above.

Figure 10:
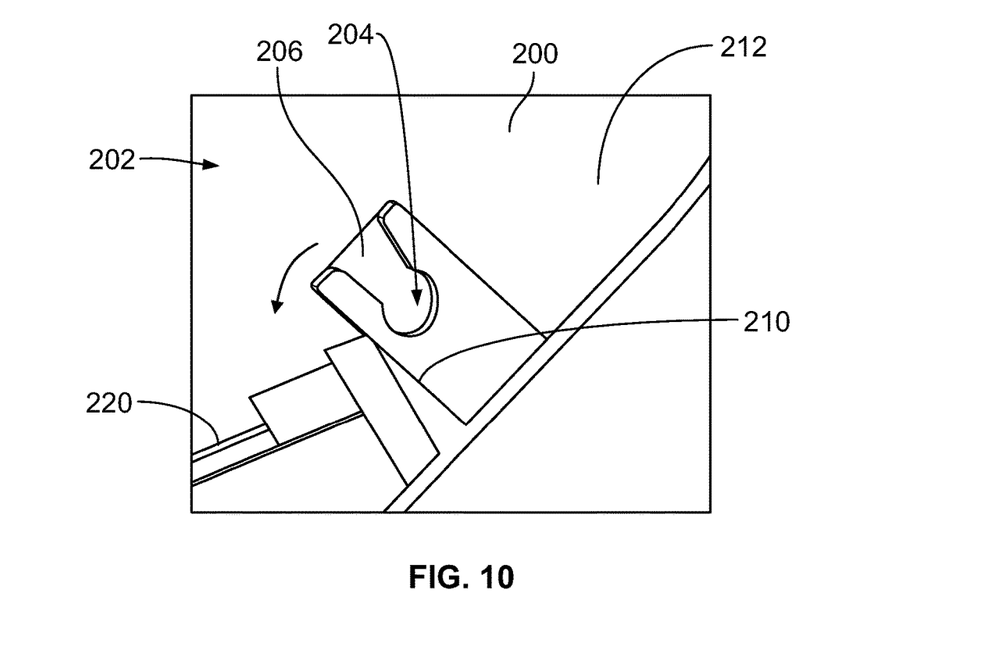
FIG. 10 illustrates an internal surface of a lateral wall of a pressure relief chamber, according to an embodiment of the present disclosure.

FIG. 10 illustrates an internal surface of a lateral wall 200 of a pressure relief chamber 202, according to an embodiment of the present disclosure. The lateral wall 200 may include a reciprocal recessed area 204 configured to rotatably retain a pivot member of a flap assembly. An open channel 206 may connect to the recessed area 204. As such, the pivot member may be inserted into the open channel 206 and urged down into the recessed area 204 in order to pivotally secure the pivot member to the lateral wall 200. As shown, the recessed area 204 may be positioned over and behind a recessed wall 210 that partially defines a counterbalance clearance space 212. Optionally, instead of recessed areas 204, holes may be formed through the lateral wall 200.

The reciprocal recessed area 204 may be oblong. The oblong shape of the recessed area 204 may ensure that the membrane flap of a flap assembly biases into a membrane support base 220 when seated thereon. The lateral wall 200 shown in FIG. 10 may be used with any of the embodiments described above.

Figure 11:
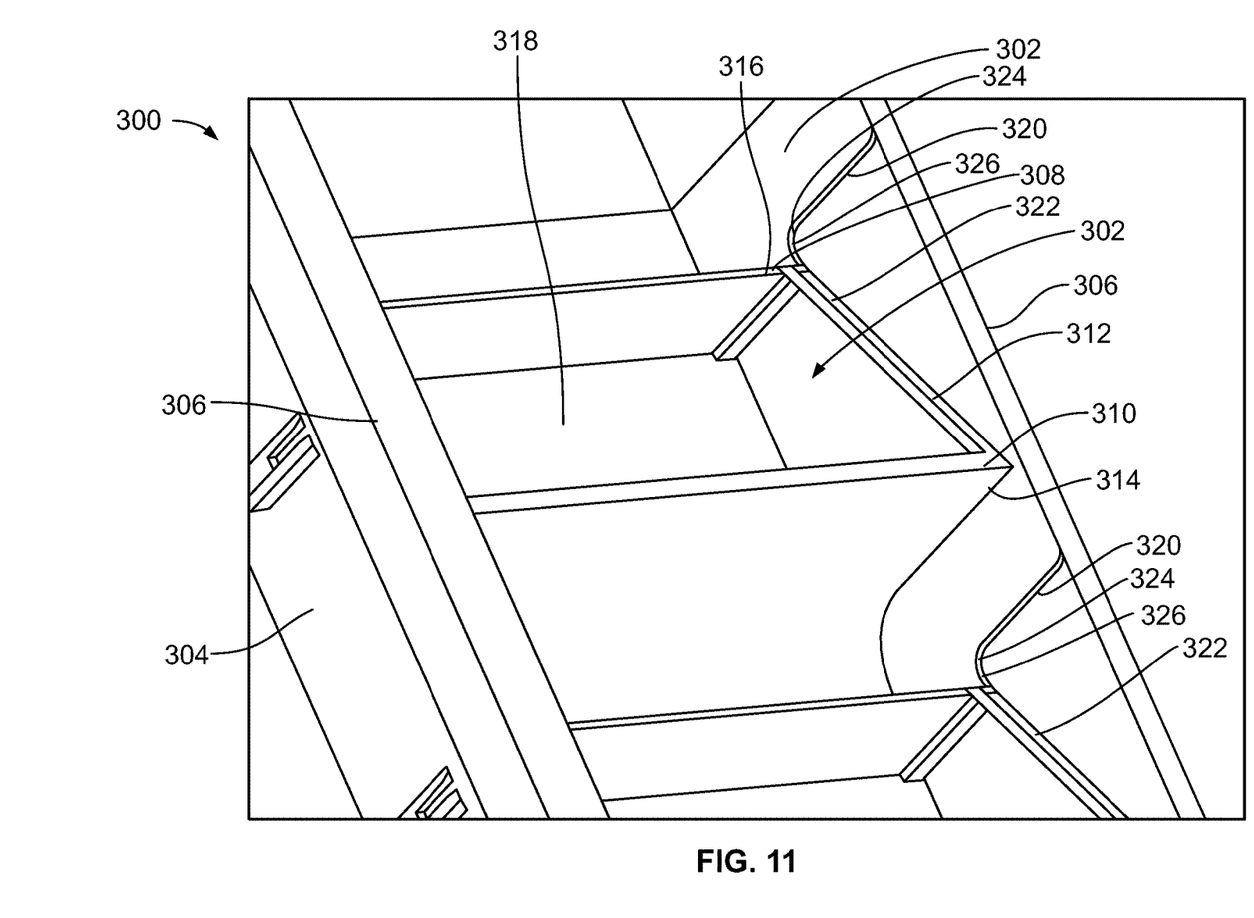
FIG. 11 illustrates a perspective front view of a pressure relief chamber, according to an embodiment of the present disclosure.

FIG. 11 illustrates a perspective front view of a vent assembly or pressure relief assembly 300, according to an embodiment of the present disclosure. As described above, the pressure relief assembly 300 may include one or more pressure relief chambers 302. The pressure relief chambers 302 shown in FIG. 11 may be used with respect to any of the pressure relief chambers described above. Each pressure relief chamber 302 may be integrally formed with a main body 304 of the pressure relief assembly 300. Alternatively, each pressure relief chamber 302 may be a cartridge that is removably secured to the main body 304.

Each pressure relief chamber 302 may be defined by opposed lateral walls 306 integrally formed with a top wall 308 and a bottom wall 310. A membrane support base 312, which may include outer ledges extending inwardly from the lateral walls 306, extends from a front edge 314 of the bottom wall 310 towards a rear edge 316 of the top wall 308. The membrane support base 312 may angle from the front edge 314 of the bottom wall 310 toward the rear edge 316 of the top wall 308, similar to as described above with respect to FIG. 2, for example.

One or more air passages 318 are formed through the membrane support base 312. As shown in FIG. 11, a single air passage may be formed through a central planar portion of the membrane support base 312. Alternatively, a plurality of air passages may be formed through the membrane support base 312. A flap assembly is configured to be pivotally secured within the pressure relief chamber 302, as described above.

Guide ramps 320 are formed or secured on or in internal surfaces of the lateral walls 306. The guide ramps 320 may connect to the ledges 322 of the membrane support base 312. As shown, the guide ramps 320 may be parallel with the top and bottom walls 308 and 310. However, the guide ramps 320 may be oriented differently than shown.

Each guide ramp 320 connects to a respective ledge 322 through a curved joint 324 (such as a reciprocal recessed area configured to rotatably retain a pivot member of a flap assembly) that defines a space 326 configured to receive and rotatably retain a pivot member of bracket of a flap assembly, such as a pivot member 74, shown in FIG. 3. In operation, opposed guide ramps 320 (for example, guide ramps 320 that are aligned within one another on opposite lateral walls 306) cooperate with another to receive the pivot members of a flap assembly and guide the flap assembly into position over the air passage 318. As the pivot members are moved into the guide ramps 320 and moved downwardly toward the air passage 318, the guide ramps 320 guide the pivot members into the spaces 326 of the curved joints 324. As the pivot members move into the spaces 326, the curved joints 324 may rotatably secure the pivot members in position, such as through a snap fit, so that the pivot members may rotate therein.

The guide ramps 320 within each pressure relief chamber 302 provide for quick and easy connection of the flap assemblies, such as any of those described above, within the pressure relief chambers 302. The guide ramps 320 may be integrally formed and molded with the pressure relief chambers 302. Alternatively, the guide ramps 320 may be separate and distinct members that are secured into the pressure relief chambers 302, such as through fasteners or adhesives.

Referring to FIGS. 1-11, embodiments of the present disclosure provide pressure relief assemblies that include counterbalances that counterbalance membrane flaps. It has been found that the counterbalances lead to less flapping noise, as compared to previously-known pressure relief devices.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

Various features of the disclosure are set forth in the following claims.

The invention claimed is:

1. A pressure relief assembly comprising:
   at least one pressure relief chamber including a membrane support base connected to a counterbalance clearance space, the membrane support base defining one or more air passages; and
   at least one flap sub-assembly pivotally secured to the at least one pressure relief chamber, the at least one flap sub-assembly including:
   (a) a pivot bracket including a counterbalance having a first width and a membrane retaining portion, the pivot bracket pivotally secured to the at least one pressure relief chamber and the counterbalance configured to pivot into the counterbalance clearance space, and
   (b) a membrane flap having a second width securely connected to the pivot bracket at the membrane retaining portion, wherein the first width is substantially equal to the second width, wherein the membrane flap seats on the membrane support base over the one or more air passages in a closed position, and is configured to move into an open position when air passes through the one or more passages from the at least one pressure relief chamber towards the at least one flap sub-assembly, and
   wherein the counterbalance counterbalances the membrane flap and is configured to pivot into the counterbalance clearance space when the membrane flap moves into the open position.

2. The pressure relief assembly of claim 1, wherein the pivot bracket further comprises an intermediate beam between the counterbalance and a membrane retaining portion that securely retains a portion of the membrane flap.

3. The pressure relief assembly of claim 2, wherein the counterbalance has a greater mass than one or both of the intermediate beam and the membrane retaining portion.

4. The pressure relief assembly of claim 2, wherein the counterbalance has a greater depth than one or both of the intermediate beam and the membrane retaining portion.

5. The pressure relief assembly of claim 2, wherein the counterbalance is longer than one or both of the intermediate beam and the membrane retaining portion.

6. The pressure relief assembly of claim 1, wherein the membrane flap comprises one or both of a tapered distal edge or tapered lateral edges.

7. The pressure relief assembly of claim 1, wherein the membrane support base comprises a perimeter frame defining a central air passage.

8. The pressure relief assembly of claim 7, wherein the perimeter frame comprises a membrane-engaging protuberance configured to sealingly engage the membrane flap in the closed position.

9. The pressure relief assembly of claim 1, wherein the at least one pressure relief chamber includes at least one guide ramp configured to guide the at least one flap assembly into a pivotally-secured position with respect to the at least one pressure relief chamber.

10. The pressure relief assembly of claim 1, wherein the counterbalance, the membrane retaining portion, and the membrane flap are aligned along a common longitudinal plane.

11. A flap assembly configured to be pivotally secured to a pressure relief chamber, the flap assembly comprising:
    a pivot bracket including a counterbalance having a first width and a membrane retaining portion, the pivot bracket configured to be pivotally secured to the pressure relief chamber and the counterbalance configured to pivot into a counterbalance clearance area of the pressure relief chamber when air passes from the pressure relief chamber towards the flap assembly; and
    a membrane flap having a second width securely and directly connected to the pivot bracket at the membrane retaining portion, wherein the counterbalance counterbalances the membrane flap, wherein the first width is substantially equal to the second width.

12. The flap assembly of claim 11, wherein the pivot bracket further comprises an intermediate beam between the counterbalance and a membrane retaining portion that securely retains a portion of the membrane flap.

13. The flap assembly of claim 12, wherein the counterbalance has a greater mass than one or both of the intermediate beam and the membrane retaining portion.

14. The flap assembly of claim 12, wherein the counterbalance has a greater depth than one or both of the intermediate beam and the membrane retaining portion.

15. The flap assembly of claim 12, wherein the counterbalance is longer than one or both of the intermediate beam and the membrane retaining portion.

16. The flap assembly of claim 11, wherein the membrane flap comprises one or both of a tapered distal edge or tapered lateral edges.

17. The flap assembly of claim 11, wherein the counterbalance, the membrane retaining portion, and the membrane flap are aligned along a common longitudinal plane.

18. A pressure relief assembly comprising:
    at least one pressure relief chamber including a membrane support base connected to a counterbalance clearance space, the membrane support base defining one or more air passages; and
    at least one flap sub-assembly pivotally secured to the at least one pressure relief chamber, the at least one flap sub-assembly including:

(a) a pivot bracket pivotally secured to the at least one pressure relief chamber and including a counterbalance having a first width configured to pivot into the counterbalance clearance space, an intermediate beam between the counterbalance, and a membrane retaining portion, wherein the counterbalance has greater mass, depth, and length than one or both of the intermediate beam and the membrane retaining portion, and (b) a membrane flap having a second width securely connected to the pivot bracket, wherein the first width is substantially equal to the second width, wherein the membrane retaining portion securely retains a portion of the membrane flap, wherein the membrane flap seats on the membrane support base over the one or more air passages in a closed position, and is configured to move into an open position when air passes through the one or more air passage from the at least one pressure relief chamber towards the at least one flap sub-assembly, wherein the counterbalance, the membrane retaining portion, and the membrane flap are aligned along a common longitudinal plane, and wherein the counterbalance counterbalances the membrane flap and is configured to pivot into the counterbalance clearance space when the membrane flap moves into the open position.

19. The pressure relief assembly of claim 18, wherein the membrane flap comprises one or both of a tapered distal edge or tapered lateral edges.

20. The pressure relief assembly of claim 18, wherein the membrane support base comprises a perimeter frame defining a central air passage.

21. The pressure relief assembly of claim 20, wherein the perimeter frame comprises a membrane-engaging protuberance configured to sealingly engage the membrane flap in the closed position.

22. The pressure relief assembly of claim 18, wherein the at least one pressure relief chamber includes at least one guide ramp configured to guide the at least one flap assembly into a pivotally-secured position with respect to the at least one pressure relief chamber.

* * * * *